US012541896B2

(12) United States Patent
Cunico et al.

(10) Patent No.: US 12,541,896 B2
(45) Date of Patent: Feb. 3, 2026

(54) COMPUTER-BASED CONTENT PERSONALIZATION OF A VISUAL DISPLAY

(71) Applicant: International Business Machines Corporation, Armonk, NY (US)

(72) Inventors: Hernan A. Cunico, Holly Springs, NC (US); Martin G. Keen, Cary, NC (US); Harry Hoots, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 18/323,852

(22) Filed: May 25, 2023

(65) Prior Publication Data

US 2024/0394943 A1 Nov. 28, 2024

(51) Int. Cl.
| | |
|---|---|
| *G06T 11/60* | (2006.01) |
| *G06F 3/01* | (2006.01) |
| *G06T 3/04* | (2024.01) |
| *G06T 3/40* | (2006.01) |
| *G06T 3/60* | (2006.01) |
| *G06T 7/10* | (2017.01) |

(52) U.S. Cl.
CPC .............. *G06T 11/60* (2013.01); *G06F 3/013* (2013.01); *G06T 3/04* (2024.01); *G06T 3/40* (2013.01); *G06T 3/60* (2013.01); *G06T 7/10* (2017.01); *G06T 2207/20084* (2013.01); *G06T 2207/20132* (2013.01)

(58) Field of Classification Search
CPC .................................. G06T 11/60; G06T 7/10
See application file for complete search history.

(56) References Cited

U.S. PATENT DOCUMENTS

| 10,061,860 | B2 | 8/2018 | Daly, Jr. | |
| 10,140,633 | B1* | 11/2018 | Jaye | G06Q 30/0277 |
| 10,235,638 | B2 | 3/2019 | Maheshwari | |
| 2013/0031470 | A1* | 1/2013 | Daly, Jr. | G06F 40/103 |
| | | | | 715/243 |
| 2014/0195345 | A1* | 7/2014 | Lyren | G06Q 30/0271 |
| | | | | 705/14.67 |

(Continued)

OTHER PUBLICATIONS

"Half Page Background Image," Demo, https://www.w3schools.com/howto/tryhow_css_halfpage_demo.htm.

(Continued)

*Primary Examiner* — Yi Yang
(74) *Attorney, Agent, or Firm* — Joseph P. Curcuru

(57) ABSTRACT

In an approach to improve adaptive content and responsive web content, embodiments of create a profile associated with a user based on monitoring online activity of the user and analyze and classify content displayed to the user based on collected data associated with a reaction from the user. Further, embodiments derive a preliminary set of topics of interests based on the reaction of the user and the analyzed and classified content and associate the preliminary set of topics of interest with the reaction of the user and the analyzed and classified content. Additionally, embodiments, analyze a location of interest to the user on associated with the content based on the preliminary set of topics of interests to personalize a display of the location for interaction by the user, and present, by a user interface, a personalized display of the location to the user.

20 Claims, 7 Drawing Sheets

(56) References Cited

U.S. PATENT DOCUMENTS

| | | | | |
|---|---|---|---|---|
| 2014/0280350 | A1* | 9/2014 | Liu | G06F 16/9535 |
| | | | | 707/793 |
| 2018/0035006 | A1* | 2/2018 | Bermundo | G06F 3/1256 |
| 2018/0241660 | A1 | 8/2018 | Fletcher | |
| 2018/0285896 | A1* | 10/2018 | Deluca | G06Q 30/0201 |
| 2020/0348754 | A1* | 11/2020 | Ehrlich | A61B 1/00 |

OTHER PUBLICATIONS

"Using Device Usage Patterns and Behaviors to Create Personalised Content," IPCOM000245881D, IP.com, Apr. 15, 2016, 4 pages.

Grigsby, J., "Responsive Images 101, Part 9: Image Breakpoints," cloudfour.com, Aug. 25, 2015, 17 pages. https://cloudfour.com/thinks/responsive-images-101-part-9-image-breakpoints/.

Evine, B., "AI, intent data boost new B2B marketing tools from Demandbase, Get Smart Content & Leadspace," MarTech, Apr. 6, 2017, 9 pages. https://martech.org/ai-intent-data-boost-new-b2b-marketing-tools-demandbase-get-smart-content-leadspace/.

Levine, B., "Startup YesPath launches AI-driven platform that automatically targets marketing content," MarTech, Mar. 21, 2016, 3 pages. https://martech.org/startup-yespath-launches-ai-driven-platform-automatically-targets-marketing-content/.

Li, Fangzheng, et al., "The Design of Adaptive User Interface Based on the Grey Relational Grade," Journal of Physics: Conference Series, v. 1060, n. 1, IOP Publishing, 2018, 9 pages.

Sarsam et al, "Towards Incorporating Personality into the Design of an Interface: A Method for Facilitating Users' Interaction with the Display," User Modeling and User-Adapted Interaction 28.1 (2018): 75-96.

* cited by examiner

601

```
@function background-focus($ratio, $bg, $box: $WWp) {
  @return (($bg + ($WWp - $box)/$ratio - $WWp) * ($ratio / ($ratio - 1)) + $WWp) * 1%;
}

.window {
  box-sizing: border-box;
width:   $WW;
height: $HH;
margin: $MM;
border: $BB;
  background-image: url('https://some.url/image.png');
  background-repeat: no-repeat;
}

.window--bg-XX-YY {
  background-position-x: background-focus($ratio, $XX, $YY);
```

FIG. 6

COMPUTER-BASED CONTENT PERSONALIZATION OF A VISUAL DISPLAY

BACKGROUND OF THE INVENTION

The present invention relates generally to electronic visual displays, and more particularly to the field of improving dynamic content and/or responsive design.

Dynamic content (i.e., adaptive content) refers to web content that changes based on the behavior, preferences, and interests of the user. It refers to websites as well as e-mail content and is generated at the moment a user requests a page. Dynamic content is personalized and adapts based on the data you have about the user and on the access time, its goal being to deliver an engaging and satisfying online experience for the visitor. Generally powered by applications and scripts, dynamic content works in tandem with static content. For example, HTML content of a landing page or of an e-mail that changes to display information that is relevant for the viewer based on location or previous interactions with the website. An e-mail where the user's name is retrieved from the database and inserted automatically via HTML text is another example of dynamic content.

Responsive web design (RWD) is a web development approach that creates dynamic changes to the appearance of a website, depending on the screen size and orientation of the device being used to view it. RWD is one approach to the problem of designing for the multitude of devices available to customers, ranging from tiny phones to huge desktop monitors. RWD uses so-called breakpoints to determine how the layout of a site will appear: one design is used above a breakpoint and another design is applied below that breakpoint. The breakpoints are commonly based on the width of the browser. The same HTML is served to all devices, using CSS (which determines the layout of webpage) to change the appearance of the page. Rather than creating a separate site and corresponding codebase for wide-screen monitors, desktops, laptops, tablets and phones of all sizes, a single codebase can support users with differently sized viewports. In responsive design, page elements reshuffle as the viewport grows or shrinks. A three-column desktop design may reshuffle to two columns for a tablet and a single column for a smartphone. Responsive design relies on proportion-based grids to rearrange content and design elements.

SUMMARY

Embodiments of the present invention disclose a computer-implemented method, a computer system, and a computer program product for personalizing visual interfaces based on user preferences, the computer-implemented method comprising: creating a profile associated with a user based on monitoring online activity of the user; analyzing and classifying content displayed to the user based on collected data associated with a reaction from the user; deriving a preliminary set of topics of interests based on the reaction of the user and the analyzed and classified content and associating the preliminary set of topics of interest with the reaction of the user and the analyzed and classified content; analyzing a location of interest to the user on associated with the content based on the preliminary set of topics of interests to personalize a display of the location for interaction by the user; and presenting, by a user interface, a personalized display of the location to the user.

BRIEF DESCRIPTION OF THE DRAWINGS

FIG. 6 illustrates one example, in accordance with an embodiment of the present invention;

DETAILED DESCRIPTION

Figure 1:
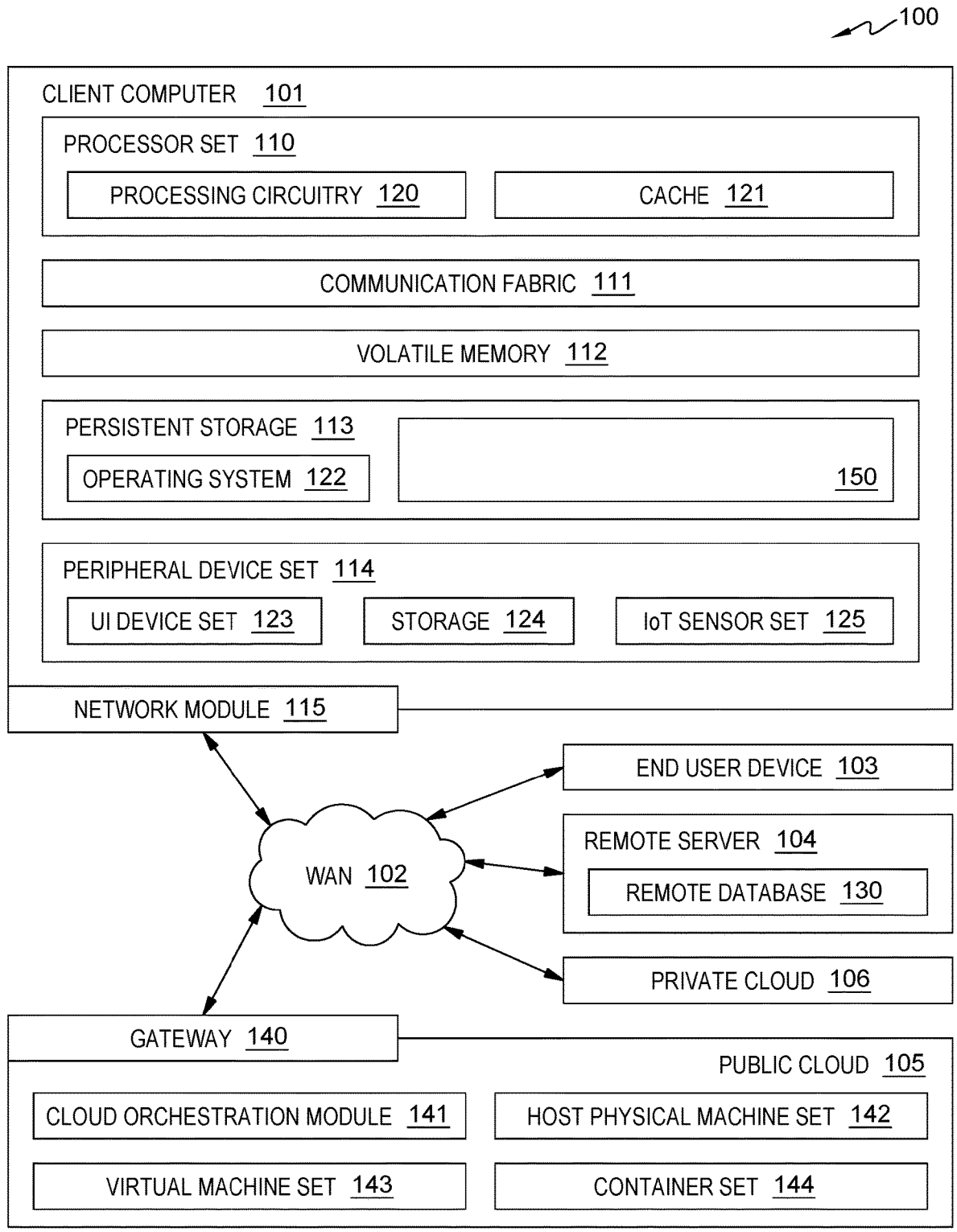
FIG. 1 is a functional block diagram illustrating a distributed data processing environment, executing a real-time personalized display program, in accordance with an embodiment of the present invention.

In various embodiments of the present invention recognize that content distribution in web pages and other user interfaces have an impact on how the user respond to that interface, and that visual designers strive for making their designs most appealing, unique, and engaging for their users. For example, on a web page, the most important visualization happens at the top ⅓ of the screen, before any attempt to scroll down by the visitor. Thus, embodiments of the present invention recognize that these efforts render the same result, optimized per the designer criteria, applies to all visitors. Further, embodiments of the present invention recognize that there is no input from the visitor around how the content or visuals are orchestrated. Therefore, is a long felt need for an artificial intelligent (AI) driven solution that can leverage user interests and restructure content and visuals accordingly.

Embodiments of the present invention recognize that one of the problems with the current techniques in the art is that they all focus on a single point of interest (focus and breakpoints). That single point of interest is determined in advance by a designer, and it doesn't target an individual user and their interests. Also, these techniques involve using the same image (or different size versions of the same image). Some additional issues/problems with the current techniques in the art comprise: a single point of interest, usually only one main theme, there is just one image for a target group, all users get the same image and focus, the randomizing images is not personalization, and A/B testing does not provide personalization. Thus, embodiments recognize that there is a need for determining a visual treatment to match the personalized viewer sentiment and area of interest, wherein a visual treatment or treatment is an action that is or can be performed to temporarily modify an existing visual display to satisfy user preferences.

Embodiments of the present invention improve the art and solve at least the problems stated above by executing/implementing an AI-driven method to enhance the user experience while still using a single set of images by dynamically defining multiple custom focus areas derived from viewer's preferences. More specifically, embodiments of the present invention improve the art and solve at least the problems stated above by (i) manipulating visual interfaces based on the user's derived preferences, (ii) ranking and mapping categorized elements from content (text or image) to an individual based on derived their preferences and interests (iii) executing contextual correlation between the derived user preferences and other content being displayed, and (iv) treating content (text or images) in function of those correlated user preferences to maximize the user experience.

Additionally, embodiments of the present invention improve the art and solve at least the problems stated above by (i) creating, by one or more processors, a profile associated with a user based on monitoring the user's online activity, (ii) analyzing, by the one or more processors, a location of interest to the user to personalize display of the location for interaction by the user, wherein the analyzing is based on at least one of a convolution neural network or a recurrent neural network, and wherein the analyzing further comprises monitoring user reaction to displayed content by direct user observation based on a camera directed toward the user's face, and (iii) presenting, by the one or more processors, a personalized display of the location to the user, wherein location factors comprise ability to flip an image, allowable image cropping before the image loses meaning, allowable image zooming before the image loses meaning, ability to rotate an image and ability to add or remove text associated with the image. Embodiments of the present invention may improve the art of dynamic content (i.e., adaptive content) by going beyond simply keeping the focus on one image (independently of the resizing) and randomizing or targeted A/B testing. Embodiments of the present invention look at how the user might respond to the visuals and then applies a treatment in a function based on an understanding of the user preferences/sentiment, which may be performed before ever presenting the first content (e.g., image) to the user by analyzing and predicting a response by the user.

Implementation of embodiments of the invention may take a variety of forms, and exemplary implementation details are discussed subsequently with reference to the Figures (i.e., FIG. 1-FIG. 7).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as vehicle operation optimization program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Component 150 may improve the current art and solve at least the issues stated above by (i) manipulating visual interfaces based on the user's derived preferences, (ii) ranking and mapping categorized elements from content (text or image) to an individual based on derived their preferences and interests, (iii) executing contextual correlation between the derived user preferences and other content being displayed, and (iv) treating content (text or images) in function of those correlated user preferences to maximize the user experience. For example, component 150 modifies the rendering of a formula one racing themed background image to re-center to focus on a particular car brand for a fan of that particular car brand and re-center that same image to focus on a different car based on a second user's preference(s). In another example, component 150 moves matching content and titles to the top of the page for each user or dynamically moves subtitles based on the preferences and/or focus of a user.

In another example, if we take a Rorschach test for example, different individuals will have different interpretations of the image and will also be drawn to different portions of those images. The same occurs when you are visiting a web page or using an app on your phone, there will always be something that catches your eye that might be different from another user looking at the same screen. To better illustrate this example, image an image with multiple types of foods. While one user might first see (or only see) tomatoes, another user might see basil and dry pasta, while another user might see salt and olives. Component 150 using a single image, we can determine what area is interesting to a user, based on collected and monitored data of user actions, focus and preferences and generated user profile, and make the identified area prominent in comparison to other areas on the single image. Component 150 may derive what sections (text or images) within a page or screen might be of interest to the user and bring those to the top of the screen. Component 150 may manipulate visual interfaces based on the user's derived preferences, rank and map categorized elements from displayed content (text or image) to a user based on the preferences/interests of the user, performs a contextual correlation between the derived user preferences and other content being displayed, and treating content (text or images) in function of those correlated user preferences to maximize the user experience, and treat the content (text or image) in function based on the correlated user preferences to maximize the user experience.

Thus, component 150 improves the art and solve at least the problems stated above by (i) creating, by one or more processors, a profile associated with a user based on monitoring the user's online activity, (ii) analyzing, by the one or more processors, a location of interest to the user to personalize display of the location for interaction by the user, wherein the analyzing is based on at least one of a convolution neural network or a recurrent neural network, and wherein the analyzing further comprises monitoring user reaction to displayed content by direct user observation based on a camera directed toward the user's face, and (iii) presenting, by the one or more processors, a personalized display of the location to the user, wherein location factors comprise ability to flip an image, allowable image cropping before the image losses meaning, allowable image zooming before the image losses meaning, ability to rotate an image and ability to add or remove text associated with the image. Component 150 may re-focus a presented image to the user, based on identified user preferences, by executing one or more various functions, wherein the various functions comprise: zooming, rotating, cropping, and other possible treatments known and understood in the art.

Figure 2:
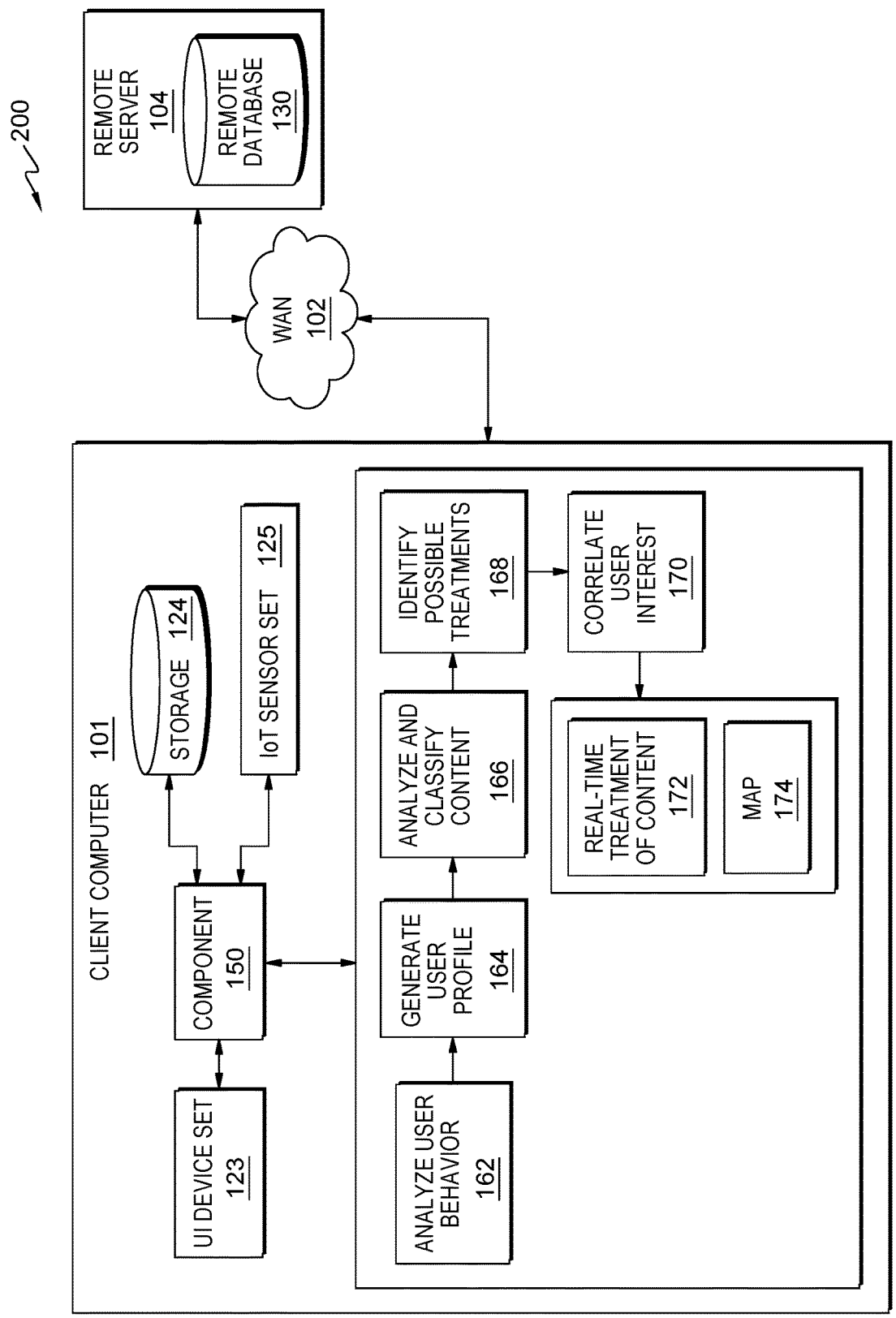
FIG. 2 illustrates a functional block diagram and operational steps of the real-time personalized display program, within the distributed data processing environment of FIGS. 1, in accordance with an embodiment of the present invention.

FIG. 2 is a functional block diagram and operational steps of component 150, generally designated 200, in accordance with one embodiment of the present invention. The term "distributed" as used in this specification describes a computer system that includes multiple, physically distinct devices that operate together as a single computer system. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, component 150 analyzes user behavior 162 to generate user profile 164. Component 150 may monitor user online activities and extract common topics and areas/elements of interest based on the monitored user data. Component 150 may utilize semantic analysis and natural language understanding to identify most common topics consumed by the user. Additionally, component 150 may analyze how common topics are consumed (e.g., but not limited to analyze search strings, sites visited, and type of information predominantly presented, type of content visited (what communication channels), time spent on topic, and/or frequency of visits). In various embodiments, common topics are predetermined. In other embodiments, common topics are selected by a user or a combination of customized and predetermined topics. Component 150 may use heat maps and eye tracking techniques to identify what content gets the most attention from this user and its location.

Component 150 may generate heat maps based on eye tracking to identify relative content interest to the user. Based on the monitored and analyzed data associated with the activities and topics of a user (i.e., user behavior), component 150 may generate user profile 164. Component 150 may receive permission to perform data collection and analysis. For example, on a client-side component 150 receives an opt-in to enable agents installed on the client side to facilitate monitoring and customized rendering logic, and on the server side, component 150 receives a user log-in to enable monitoring and enabling personalized rendering. Component 150 may analyze a location of interest for the user on displayed content (e.g., displayed image) to personalize the display of the location for interaction by the user, wherein analyzing further comprises monitoring user reaction(s) to displayed content by direct user observation based on a camera directed toward the visual focus of the user and other user measured factors captured by IoT sensor set 125 (e.g., facial expression, body language, and/or sound analysis). User reactions may be any movement, expression, or interaction by the user that can me measured by IoT sensor set 125 (e.g., visual focus, shouting, body movement, facial expressions, sound analysis, body language, heart rate, etc.).

Further, in the depicted embodiment, component 150 analyzes and classifies content 166. Component 150 may utilize convolutional and recurrent neural networks for analyzing and classifying the visual content presented to the user (i.e., analyze and classify content 166). For example, component 150, via IoT sensor set 125, monitors and collects data associated with the visual focus of a user and analyzes and classifies, via convolutional and recurrent neural networks, the monitored and/or visual focus data. This way component 150 identifies the "whole picture" presented to the user as well as what catches the user attention. Component 150 may derive a preliminary set of topics of interests based on the analyzed and classified visual focus data and associates the topics of interest with the visual focus data. Component 150 may monitor, via IoT sensor set 125, user reactions, annotate positive/negative responses in function of context and eye focus, facial expression, body language, and/or sound analysis, wherein component 150 creates a correlation matrix with the content analysis, focus area, image analysis, user reaction and stores the correlation matrix in remote database 130 (e.g., a central repository). In various embodiments, the correlation matrix may comprise, but is not limited to, user data, channel, topic of interest, user focus, size of image, content classification, user response and corresponding labels and coordinates.

Component 150, via analyze and classify content 166, may utilize a combination of convolutional neural networks and recurrent neural networks (and other neural networks variations) for visual processing at different stages. For example, component 150 may apply these neural networks when monitoring and analyzing content consumed by the user and/or when analyzing the content to identify what portion of an image to enhance to maximize user engagement. These neural networks enable component 150 to perform visual processing (e.g., processing images and videos on their own as well as the entire screen), classification and categorization (e.g., identifying what's on each image and what part/portion of the screen), context processing (e.g., aggregating the classification and categorization and deriving a theme that we use to correlate with the topic analysis), and creating a reference matrix with annotations from this analysis. For example, capturing size, location, color predominance, object predominance, scene, theme, context, and/or any other reference known point or data known and understood in the art.

Figure 3:
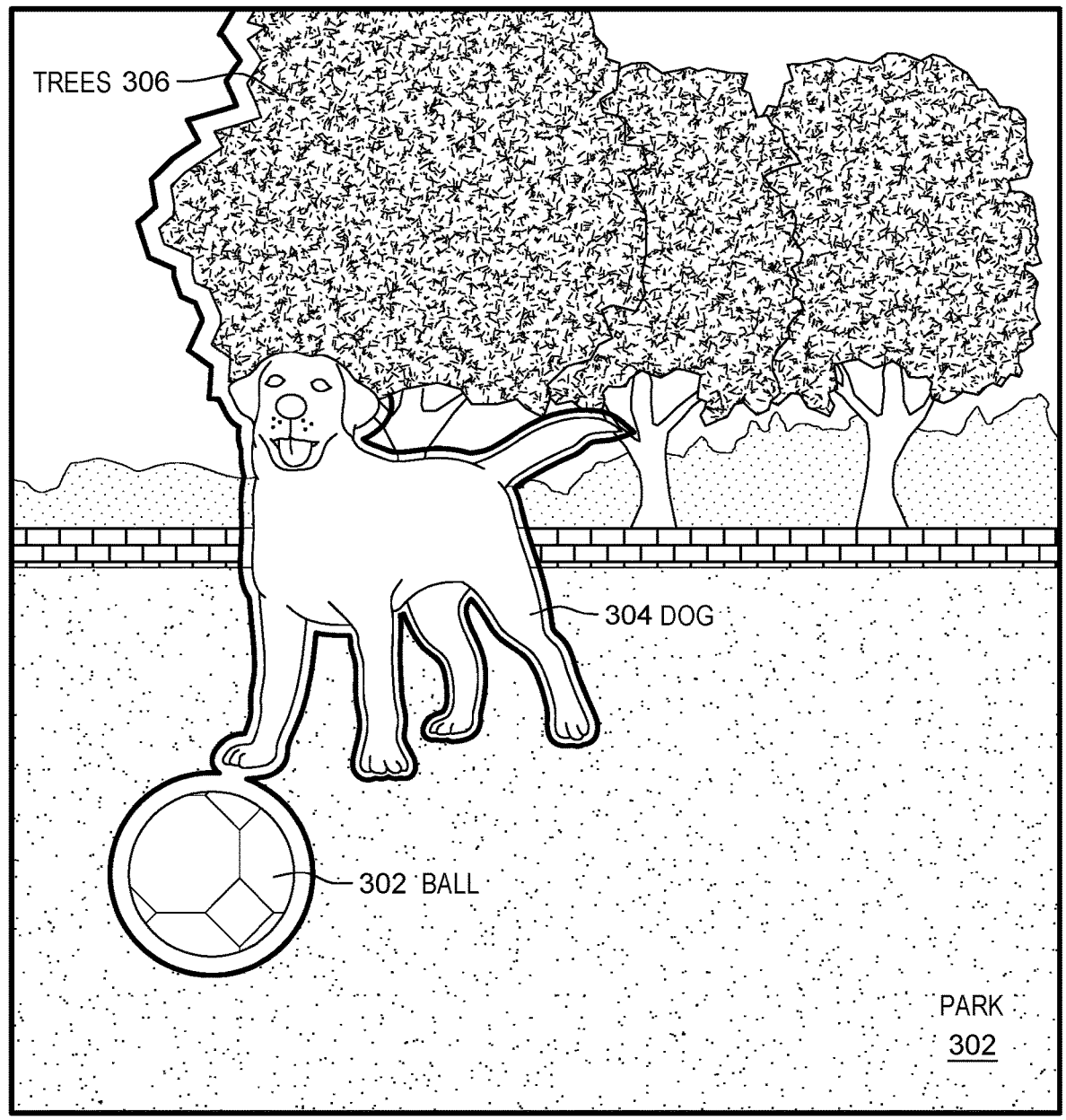
FIG. 3 illustrates one example, in accordance with an embodiment of the present invention.

In the depicted embodiment, component 150 identifies possible treatments 168 through site analysis and treatment. Component 150 may identify possible treatments for each identified content unit through site analysis and treatment. Component 150 may utilize the analyzed and classified date from analyze and classify content 166 to analyze one or more targe sites or applications. Component 150 may analyze every available page and the content as the user interacts with it (e.g., views it, engages with it, etc.). On each page, component 150 may perform at least the following: content analysis (derive topics with NLU), image analysis (derive topics with CNN/RNN), content classification and categorization, context processing (derive theme from combination text and image analysis), boundaries identification by topic, scene, element, wherein each content unit, is annotate by the identified boundaries, determining potential treatments for each content unit and adjacent content units (e.g., if it is an image, can it be rotated? Can it be flipped? If it is text, is there an image associated? Can we move the text somewhere else?) and annotate the content units with the results of this analysis. For example, FIG. 3 shows the analysis only on an image, not a full page. In the depicted example, show in FIG. 3, component 150, through the analysis described above, identifies ball 302, dog 304, and trees 306 within park 300. In FIG. 3, the analysis extends to the entirety of the page, not just images, to determine the actions of every element and the context of each image as well as the topic, intention, sentiment, and context of the copy. For example, the ball could be flipped or rotated in any direction. However, dog and trees can only be flipped horizontally. Other conditions, such context, could also apply. For example, the dog elements could be flipped horizontally individually but not if both are together as determined by context.

During identify possible treatments 168, component 150 may define specific (as well as general) treatment rules for each of the content units identified in the previous analysis based on the individual characteristics of the content units, wherein the individual characteristics refers to unique characteristics of each element identified and annotated during the analysis. Component 150 may apply general handling rules for each of the content units identified for each element (e.g., can the unit or element be flipped? If so, in what direction? How much the image can be cropped before it loses its meaning? How much it can be zoomed in/out before the quality drops? Can it be rotated? Is the text part of a logical sequence? Can the sequence be altered without changing the meaning?). The treatment rules can be initially set (i.e., predetermined) and/or they can be learned over time based on the collected, analyzed, and stored date so that the new rules (i.e., learned rules) are derived from user interactions. Depending on the analyzed interaction between content units, component 150 may determine whether certain elements can be presented in isolation or must be presented as a group (i.e., context). Further, component 150 may define new potential focus points, panning and tilting preferences, define what content units can be presented in different sequence, and annotates the content units for later use in the presentation stage (i.e., real-time treatment of content 172).

Figure 4:
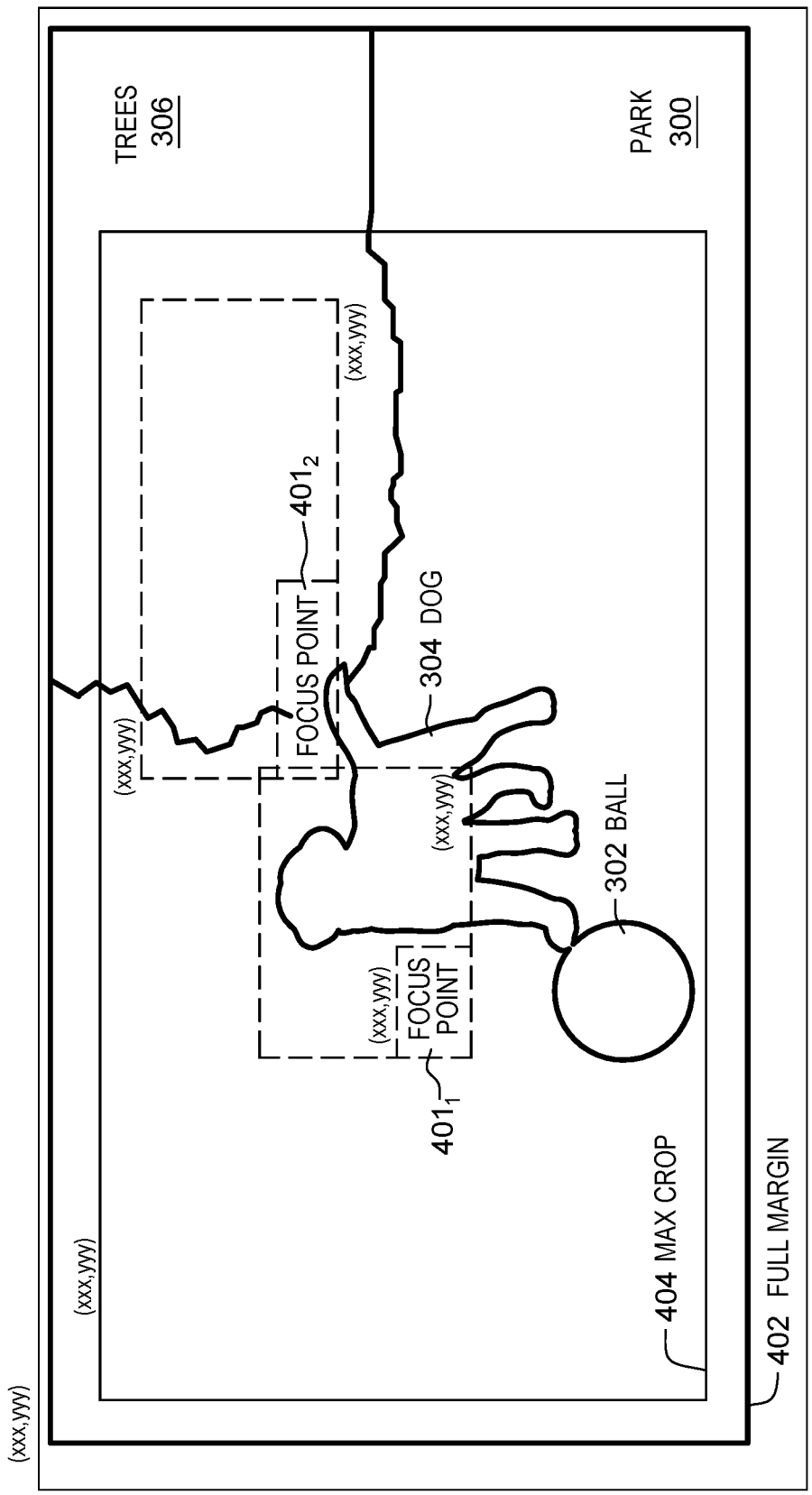
FIG. 4 illustrates one example, in accordance with an embodiment of the present invention.

For example, in FIG. 4 components (e.g., ball 302, dog 304, trees 306, and park 300) and potential treatment options (e.g., focus point $401_1$ and $401_2$) are identified by component 150. In FIG. 4, the focus points are within max crop 404 and max crop 404 is within full margin 402, wherein max crop 404 and full margin 402 are the maximum crop and full margin of the display content as it is known and understood in the art. In this example, component 150 defines and annotates the identified content and focus points (e.g., ball 302, dog 304, trees 306, park 300 and focus point $401_1$ and $401_2$, respectively). In FIG. 4, component 150 identifies the focus points of the user to be on the dog (i.e., focus point focus point $401_1$) and a portion of the trees (i.e., focus point $401_2$). In various embodiments, component 150 may rank the focus points of the user using predefined weights and data. In other examples, displayed content may comprise $401_1$-$401_N$ focus points wherein N represents a positive integer, and accordingly the number of scenarios implemented in a given embodiment of the present invention is not limited to those depicted in FIG. 4.

Component 150 may correlate user interest to content classification. Based on the analysis and classification of content of user data, component 150 correlates user interest 170 with a present image. In various embodiments, independently on where it is implemented, component 150 predicts what parts of the current content would be most supporting and engaging for each individual user. Component 150 may take the outlined figure shown in FIG. 4. In this example, depicted in FIG. 4, User A might be a dog person, but User B might be afraid of dogs and prefer trees. Based on the identified user preferences and/or focus behavior, component 150 may predict the type of reaction for each of the users and update the focus points on the image accordingly. Component 150 may rank cross-references between the elements identified in the current content and the user interest. The ranking may be based on the user response so positive responses to certain themes and object types would rank higher. Component 150 may identify what elements would be most appealing, within context, to each specific user visiting the site based on the monitored, analyzed, and collected data associated with the user and the displayed image. Based on the identified elements and/or potential focus area on an image based on user preferences/ user data, component 150 executes real-time treatment of content units to match the identified user interests. For example, going back to FIG. 4, enhancing the dog and/or re-centering the image so that User A is visually drawn to the dog.

Component 150 may present a personalized display of an identified area of interest on the displayed content (i.e., location) to the user wherein location factors comprise ability to flip an image, allowable image cropping before the image losses meaning, allowable image zooming before the image losses meaning, ability to rotate an image and ability to add or remove text associated with the image. Component 150 may apply the new rendering logic following the re-definitions calculated in the previous stage (e.g., what treatment can be applied to each element that will be presented to the user and it refers to the "merge" between the content analysis, user analysis, and the mapping between those two in function of the predicted user preference). Meaning component 150 may map 174 the output of the previous steps above to computer code that can be utilized to refocus elements on a web page for the user in real-time. In various embodiments, for simplicity, this generated and/ or mapped code (i.e., map 174) does not include zooming, rotating, cropping, and other possible treatments described earlier. Component 150 may identify two content units on an image (e.g., webpage) as areas of interest based on identified user preferences, wherein the presentation rules enable component 150 to change their order without altering the message or function.

Figure 5:
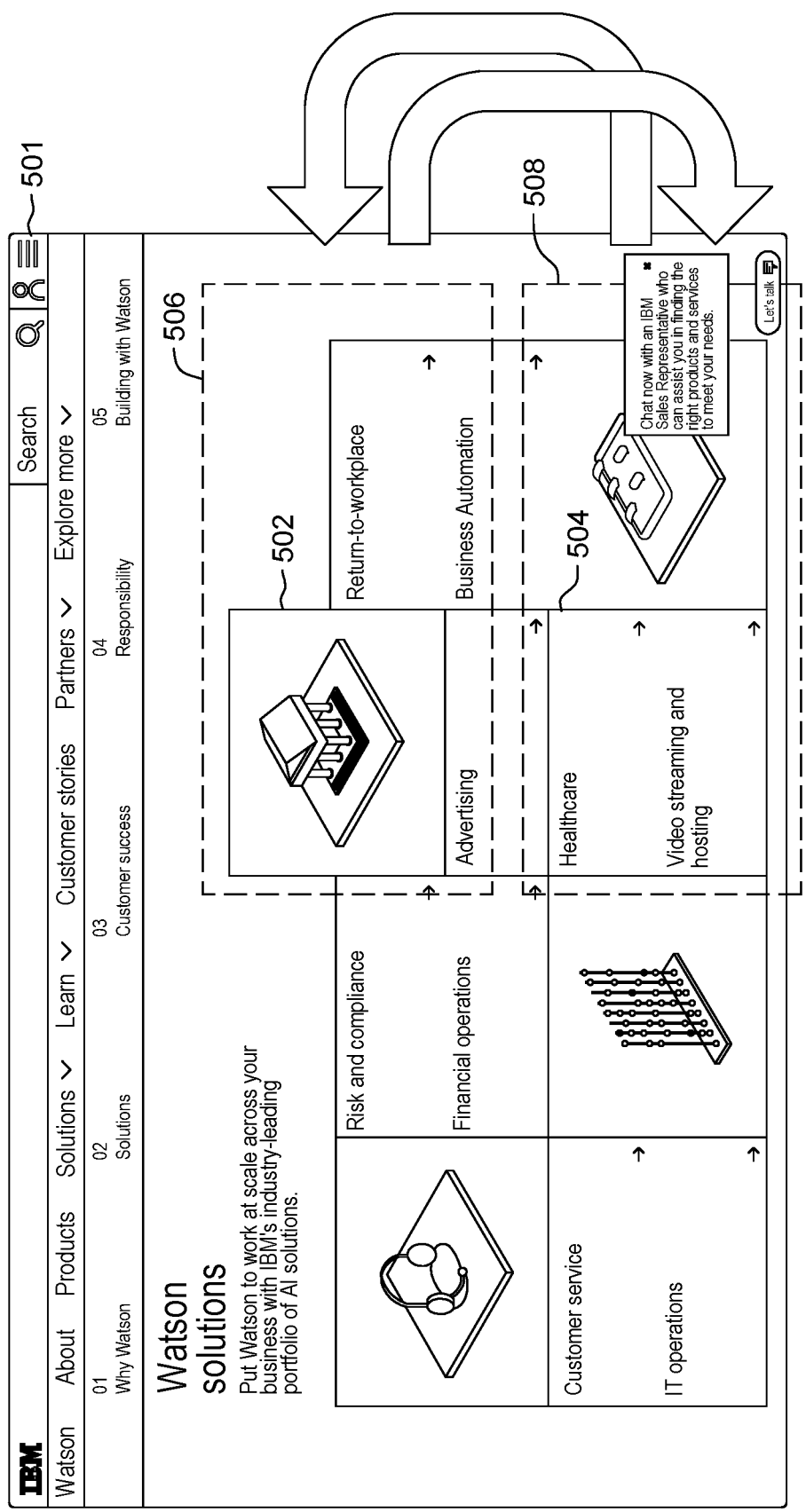
FIG. 5 illustrates one example, in accordance with an embodiment of the present invention.

For example, in FIG. 5, two content units, content 502 and content 504, have been identified as areas of interest by component 150 on webpage 501 based on monitored and analyzed user data. In this example, component 150, based on monitored and analyzed user data (i.e., user preferences), identifies that content 504 is ranked higher than content 502. Therefore, based on the presentation rules, component 150 maps out computer code to alter webpage 501 so that content 504 is moved into area 506 (the location where content 502 was located) and content 502 moves to area 508 (the location where content 504 was located). An example of the generated and/or mapped code is illustrated in FIG. 6. In FIG. 6, rendering code 601 is modified to better suit a specific user based on the identified interest of the user.

FIG. 3 is an example illustrating image semantic analysis. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 4 is an example illustrating image components and potential treatment options. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 5 is an example illustrating a rearranging of content on a webpage to satisfy user interests. FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 6 is an example illustrating the modification of rendering code to meet the interests of the user. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Figure 7:
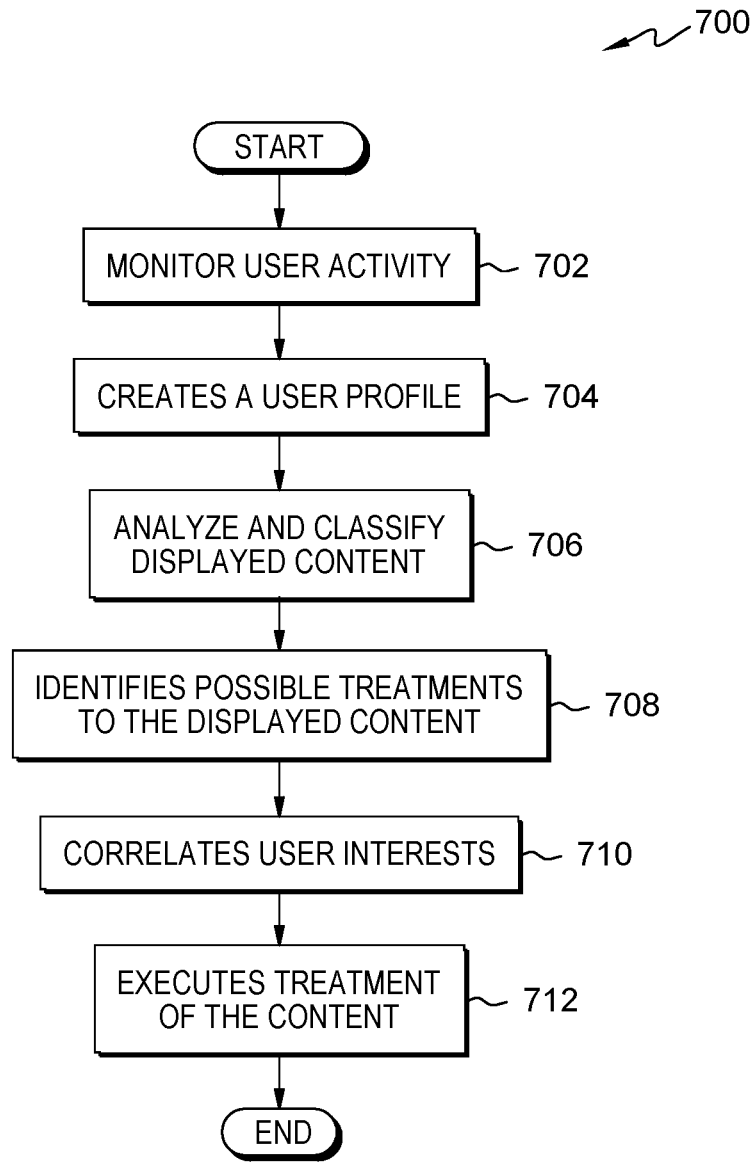
FIG. 7 illustrates operational steps of the real-time personalized display program, on a server computer within the distributed data processing environment of FIGS. 1, for generating a personalized visual display of content to a user in real-time, in accordance with an embodiment of the present invention.

FIG. 7 illustrates operational steps of component 150, generally designated 700, in communication with client computer 101, remote server 104, private cloud 106, EUD 103, and/or public cloud 105, within distributed data processing environment 100, for generating a personalized visual display of content to a user in real-time, in accordance with an embodiment of the present invention. FIG. 5 provides an illustration of one implementation and does not imply any limitations with regard to the environments in which different embodiments may be implemented. Many modifications to the depicted environment may be made by those skilled in the art without departing from the scope of the invention as recited by the claims.

In block 702, component 150 monitors user activity. In various embodiments, component 150 may monitor user online activities and extract common topics and areas/elements of interest based on the monitored user data, wherein common topics are predetermined or user specified topics or areas of interest. Component 150, via IoT sensor set 125, may collect and monitor data of user actions, focus and preferences. Component 150 may utilize semantic analysis and natural language understanding to identify most common topics consumed by the user. Additionally, component 150 may analyze how common topics are consumed (e.g., but not limited to analyze search strings, sites visited, and type of information predominantly presented, type of content visited (what communication channels), time spent on topic, and/or frequency of visits). In various embodiments, common topics are predetermined. In other embodiments, common topics are selected by a user or a combination of customized and predetermined topics. Component 150 may use heat maps and eye tracking techniques to identify what content gets the most attention from this user and its location.

In block 704, component 150 creates a user profile based on the monitored and collected data in block 702. In various embodiments, based on the monitored and analyzed data associated with the activities and topics of a user (i.e., user behavior), component 150 generates a user profile. Component 150 may receive permission to perform data collection and analysis. For example, on a client-side component 150 receives an opt-in to enable agents installed on the client side to facilitate monitoring and customized rendering logic, and on the server side, component 150 receives a user log-in to enable monitoring and enabling personalized rendering. In various embodiments, component 150 creates a profile associated with a user based on monitoring the user's online activity, wherein the user profile is created based on analyzing user factors associated with the user comprising at least one of search strings, websites visited, information presented by the websites, type of content presented by the websites, time spent on a topic presented by the websites, or frequency of visits to the websites, wherein the user factors further comprise generating heat maps based on eye tracking to identify relative content interest to the user.

In block 706, component 150 analyzes and classifies content displayed to the user. Component 150 may utilize convolutional and recurrent neural networks for analyzing and classifying the visual content presented to the user. For example, component 150, via IoT sensor set 125, monitors and collects data associated with the visual focus of a user and analyzes and classifies, via convolutional and recurrent neural networks, the monitored and/or visual focus data associated with content presented to the user. Component 150 may derive a preliminary set of topics of interests based on the analyzed and classified visual focus data and associates the topics of interest with the visual focus data. Component 150, via analyze and classify content 166, may utilize a combination of convolutional neural networks and recurrent neural networks (and other neural networks variations) for visual processing at different stages. For example, component 150 may apply these neural networks when monitoring and analyzing content consumed by the user and/or when analyzing the content to identify what portion of an image to enhance to maximize user engagement. These neural networks enable component 150 to perform visual processing (e.g., processing images and videos on their own as well as the entire screen), classification and categorization (e.g., identifying what's on each image and what part/portion of the screen), context processing (e.g., aggregating the classification and categorization and deriving a theme that we use to correlate with the topic analysis), and creating a reference matrix with annotations from this analysis.

In block 708, component 150 identifies possible treatments to the displayed content. Component 150 may identify possible treatments for each identified content unit through site analysis and treatment. Component 150 may utilize the analyzed and classified date from analyze and classify content 166 to analyze one or more targe sites or applications. Component 150 may analyze every available page and the content as the user interacts with it (e.g., views it, engages with it, etc.). On each page, component 150 may perform at least the following: content analysis (derive topics with NLU), image analysis (derive topics with CNN/RNN), content classification and categorization, context processing (derive theme from combination text and image analysis), boundaries identification by topic, scene, element, wherein each content unit, is annotate by the identified boundaries, determining potential treatments for each content unit and adjacent content units (e.g., if it is an image, can it be rotated? Can it be flipped? If it is text, is there an image associated? Can we move the text somewhere else?) and annotate the content units with the results of this analysis.

In block 710, component 150 correlates user interests with the classified content associated with the displayed content to the user. Component 150 may correlate user interest to content classification. Based on the analysis and classification of content of user data, component 150 correlates user interest with a present image. In various embodiments, independently on where it is implemented, component 150 predicts what parts of the current content would be most supporting and engaging for each individual user. Component 150 may take the outlined figure shown in FIG. 4. Component 150 may rank cross-references between the elements identified in the current content and the user interest. The ranking may be based on the user response so positive responses to certain themes and object types would rank higher. Component 150 may identify what elements would be most appealing, within context, to each specific user visiting the site based on the monitored, analyzed, and collected data associated with the user and the displayed image.

In block 712, component 150 executes treatment of content based on the correlated user interests and the displayed content. Based on the identified elements and/or potential focus area on an image and user preferences/user data, component 150 executes real-time treatment of content units to match the identified user interests. Component 150 may apply the new rendering logic following the re-definitions calculated in the previous stage. Meaning component 150 may map 174 the output of the previous steps above to computer code that can be utilized to refocus elements on a web page for the user in real-time. In various embodiments, for simplicity, this generated and/or mapped code (i.e., map 174) does not include zooming, rotating, cropping, and other possible treatments described earlier. Component 150 may identify two content units on an image (e.g., webpage) as areas of interest based on identified user preferences, wherein the presentation rules enable component 150 to change their order without altering the message or function. In various embodiments, the executed treatment of content based on the correlated user interests and the displayed content outputs a personalized display of an identified area of interest on the displayed content (i.e., location) to the user wherein location factors comprise ability to flip an image, allowable image cropping before the image losses meaning, allowable image zooming before the image losses meaning, ability to rotate an image and ability to add or remove text associated with the image.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for personalizing visual interfaces based on user preferences, the computer-implemented method comprising:
   creating a profile associated with a user based on monitoring online activity of the user;
   analyzing and classifying content displayed to the user based on collected data associated with a reaction from the user, wherein the analyzing is based on at least one of a convolution neural network or a recurrent neural network;
   deriving a preliminary set of topics of interests based on the reaction of the user and the analyzed and classified content and associating the preliminary set of topics of interest with the reaction of the user and the analyzed and classified content;
   analyzing a location of interest to the user associated with the content based on the preliminary set of topics of interests to personalize a display of the location for interaction by the user;
   ranking and mapping categorized elements from the content to the user based the preliminary set of topics of interest wherein the ranking comprises ranking cross-references between one or more elements identified in the content and the preliminary set of topics of interests associated with the user; and
   manipulating visual interfaces by modifying at least an image on the visual interfaces based on the preliminary set of topics of interests associated with the user.

2. The computer-implemented method of claim 1, wherein the profile is created based on analyzing user factors associated with the user comprising at least one of search strings, websites visited, information presented by the websites, type of content presented by the websites, time spent on a topic presented by the websites, or frequency of visits to the websites.

3. The computer-implemented method of claim 2, wherein the user factors further comprise generating heat maps based on eye tracking to identify relative content interest to the user, and wherein the analyzing further comprises monitoring user reaction to displayed content by direct user observation based on a camera directed toward the user's face.

4. The computer-implemented method of claim 1, wherein modifying the at least an image on the visual interfaces is based on location factors, wherein location factors comprises at least one of flipping the image, cropping the image, zooming in on the image, rotating the image, or adding or removing text associated or present in the image.

5. The computer-implemented method of claim 1, further comprising:
   identifying possible treatments for each identified content unit through site or application analysis and treatment, wherein an available page and the content as the user interacts with the available page is analyzed.

6. The computer-implemented method of claim 1, further comprising:
   correlating user interest to content classification based on an analysis and classification of content of user data, wherein user interests are correlated with displayed content; and
   dynamically identifying one or more portions of the displayed content that would meet an identified interest of the user.

7. The computer-implemented method of claim 6, further comprising:
   executing, based on the identified elements and potential focus area on the displayed content and user preferences, real-time treatment of content units of the displayed content to match the identified user interests by mapping a new rendering logic following a re-definition calculation to computer code to refocus elements on a web page for the user in real-time.

8. A computer system comprising:
   one or more computer processors;
   one or more computer readable storage devices;
       program instructions stored on the one or more computer readable storage devices for execution by at least one of the one or more computer processors, the stored program instructions comprising:
       program instructions to create a profile associated with a user based on monitoring online activity of the user;
       program instructions to analyze and classify content displayed to the user based on collected data associated with a reaction from the user, wherein the analyzing is based on at least one of a convolution neural network or a recurrent neural network;
       program instructions to derive a preliminary set of topics of interests based on the reaction of the user and the analyzed and classified content and associate the preliminary set of topics of interest with the reaction of the user and the analyzed and classified content;
       program instructions to analyze a location of interest to the user associated with the content based on the preliminary set of topics of interests to personalize a display of the location for interaction by the user;
       program instructions to rank and map categorized elements from the content to the user based the preliminary set of topics of interest wherein the ranking comprises ranking cross-references between one or more elements identified in the content and the preliminary set of topics of interests associated with the user; and
       program instructions to manipulate visual interfaces by modifying at least an image on the visual interfaces based on the preliminary set of topics of interests associated with the user.

9. The computer system of claim 8, wherein the profile is created based on analyzing user factors associated with the user comprising at least one of search strings, websites visited, information presented by the websites, type of content presented by the websites, time spent on a topic presented by the websites, or frequency of visits to the websites.

10. The computer system of claim 9, wherein the user factors further comprise generating heat maps based on eye tracking to identify relative content interest to the user, and wherein the analyzing further comprises monitoring user reaction to displayed content by direct user observation based on a camera directed toward the user's face.

11. The computer system of claim 8, wherein modifying the at least an image on the visual interfaces is based on location factors, wherein location factors comprises at least one of flipping the image, cropping the image, zooming in on the image, rotating the image, or adding or removing text associated or present in the image.

12. The computer system of claim 8, further comprising:
program instructions to identify possible treatments for each identified content unit through site or application analysis and treatment, wherein an available page and the content as the user interacts with the available page is analyzed.

13. The computer system of claim 8, further comprising:
program instructions to correlate user interest to content classification based on an analysis and classification of content of user data, wherein user interests are correlated with displayed content; and
program instructions to dynamically identify one or more portions of the displayed content that would meet an identified interest of the user.

14. The computer system of claim 13, further comprising:
program instructions to execute, based on the identified elements and potential focus area on the displayed content and user preferences, real-time treatment of content units of the displayed content to match the identified user interests by mapping a new rendering logic following a re-definition calculation to computer code to refocus elements on a web page for the user in real-time, wherein the refocus of the elements on the webpage comprises temporarily modifying an existing visual display to satisfy user preferences.

15. A computer program product on a non-transitory computer readable medium comprising:
one or more computer readable storage devices and program instructions stored on the one or more computer readable storage devices, the stored program instructions comprising:
program instructions to create a profile associated with a user based on monitoring online activity of the user;
program instructions to analyze and classify content displayed to the user based on collected data associated with a reaction from the user, wherein the analyzing is based on at least one of a convolution neural network or a recurrent neural network;
program instructions to derive a preliminary set of topics of interests based on the reaction of the user and the analyzed and classified content and associate the preliminary set of topics of interest with the reaction of the user and the analyzed and classified content;
program instructions to analyze a location of interest to the user associated with the content based on the preliminary set of topics of interests to personalize a display of the location for interaction by the user;
program instructions to rank and map categorized elements from the content to the user based the preliminary set of topics of interest wherein the ranking comprises ranking cross-references between one or more elements identified in the content and the preliminary set of topics of interests associated with the user; and
program instructions to manipulate visual interfaces by modifying at least an image on the visual interfaces based on the preliminary set of topics of interests associated with the user.

16. The computer program product on the non-transitory computer readable medium of claim 15, wherein the profile is created based on analyzing user factors associated with the user comprising at least one of search strings, websites visited, information presented by the websites, type of content presented by the websites, time spent on a topic presented by the websites, or frequency of visits to the websites.

17. The computer program product on the non-transitory computer readable medium of claim 16, wherein the user factors further comprise generating heat maps based on eye tracking to identify relative content interest to the user, and wherein the analyzing further comprises monitoring user reaction to displayed content by direct user observation based on a camera directed toward the user's face.

18. The computer program product on the non-transitory computer readable medium of claim 15, wherein modifying the at least an image on the visual interfaces is based on location factors, wherein location factors comprises at least one of flipping the image, cropping the image, zooming in on the image, rotating the image, or adding or removing text associated or present in the image.

19. The computer program product on the non-transitory computer readable medium of claim 15, further comprising:
program instructions to identify possible treatments for each identified content unit through site or application analysis and treatment, wherein an available page and the content as the user interacts with the available page is analyzed; and
program instructions to define specific treatment rules for each of the content units based on the individual characteristics of the content units, wherein the individual characteristics refers to unique characteristics of each element identified and annotated during the analysis.

20. The computer program product on the non-transitory computer readable medium of claim 15, further comprising:
program instructions to correlate user interest to content classification based on an analysis and classification of content of user data, wherein user interests are correlated with displayed content;
program instructions to dynamically identify one or more portions of the displayed content that would meet an identified interest of the user; and
program instructions to execute, based on the identified elements and potential focus area on the displayed content and user preferences, real-time treatment of content units of the displayed content to match the identified user interests by mapping a new rendering logic following a re-definition calculation to computer code to refocus elements on a web page for the user in real-time, wherein the refocus of the elements on the webpage comprises temporarily modifying an existing visual display to satisfy user preferences.

* * * * *